United States Patent [19]

Roe et al.

[11] Patent Number: 5,220,432
[45] Date of Patent: Jun. 15, 1993

[54] METHODS AND APPARATUS FOR HALF-TONE IMAGING UTILIZING A ROTATED HALF-TONE DOT MAP

[75] Inventors: Malcolm D. M. Roe; Michael Slone-Murphy, both of Herts, England

[73] Assignee: Crosfield Electronics, Ltd., England

[21] Appl. No.: 694,215

[22] Filed: Apr. 12, 1991

[30] Foreign Application Priority Data

Apr. 12, 1990 [GB] United Kingdom ............... 9008318

[51] Int. Cl.$^5$ .................... H04N 1/21; H04N 1/40
[52] U.S. Cl. ........................ 358/298; 358/456; 358/78
[58] Field of Search ............... 358/298, 456, 459, 460, 358/465, 466, 75, 78, 80

[56] References Cited

U.S. PATENT DOCUMENTS

| | | | |
|---|---|---|---|
| 3,657,472 | 4/1972 | Taudt et al. | 358/78 X |
| 4,084,183 | 4/1978 | Keller et al. | 358/298 X |
| 4,185,304 | 1/1980 | Holladay | 358/298 |
| 4,447,833 | 5/1984 | Sano et al. | 358/298 |
| 4,543,613 | 9/1985 | Sakamoto | 358/298 |
| 4,897,736 | 1/1990 | Sugino | 358/298 X |
| 4,969,053 | 11/1990 | Outa et al. | 358/298 X |

FOREIGN PATENT DOCUMENTS

| | | |
|---|---|---|
| 293214 | 11/1988 | European Pat. Off. . |
| 427380A2 | 5/1991 | European Pat. Off. . |
| 3320691 | 12/1983 | Fed. Rep. of Germany . |
| 2516329 | 5/1983 | France . |
| 2535477 | 5/1984 | France . |
| 2111342 | 6/1983 | United Kingdom . |

OTHER PUBLICATIONS

"An Optimum Method for Two-Level Rendition of Continuous-Tone Pictures", B. E. Bayer, Institute of Electrical and Electronics Engineers, International Conference on Communications, Jun. 11-13, 1973, Seattle, Wash., pp. 26-11-26-15, New York, 1973.

*Primary Examiner*—Benjamin R. Muller
*Assistant Examiner*—Eric Frahm
*Attorney, Agent, or Firm*—Sughrue, Mion, Zinn, Macpeak & Seas

[57] ABSTRACT

An apparatus for controlling the exposure of a record medium (4) to a radiation beam (3) during relative scanning movement between the medium and the beam to record half-tone image separations at particular screen angles, includes a control signal generator (6); a controller (8,9); and a store (7) for storing a previously generated half-tone dot map under the control of the controller (9), the control signal generator being responsive to an image signal representing the color content of an image and a signal from the store to generate a binary beam control signal by scanning the map in synchronism with the beam scanning the record medium and comparing the image signal with the current map value, the binary beam control signal being generated in accordance with the result of the comparison. The store (7) is of a size sufficient to enable the half-tone dot map to define a number of adjacent half-tone dot areas, each area corresponding to a half-tone dot and the content of at least some areas being different. The control signal generator (6) is responsive to each area in the map for generating the control signal for adjacent, corresponding areas on the record medium. The controller (8) scans the half-tone dot map in the same direction and in the same increments for all screen angles and supplies corresponding map values to the control signal generator (6).

5 Claims, 2 Drawing Sheets

A SQUARE DOT CELL WITH
M = 30 AND N = 40

AN L-SHAPED DOT CELL WITH
M= 30 AND N = 40
M ≤ N

AN L-SHAPED DOT CELL WITH
M= 40 AND N= 30
M ≥ N

METHODS AND APPARATUS FOR HALF-TONE IMAGING UTILIZING A ROTATED HALF-TONE DOT MAP

FIELD OF THE INVENTION

The invention is concerned with the reproduction of an image in half-tone form by modulating a scanning beam in a binary manner to cause the selective exposure of portions of half-tone dots corresponding to image pixels. In particular the invention relates to methods of controlling the exposure of a record medium to a radiation beam during relative scanning movement between the medium and the beam in which an image signal representing the colour content of an image and a previously generated half-tone dot map at a particular screen angle are used to generate a binary beam control signal by scanning the map in synchronism with the beam scanning the record medium and comparing the image signal with the current map value, the binary beam control signal being generated in accordance with the result of the comparison. Such methods are hereinafter referred to as of the kind described.

DESCRIPTION OF THE PRIOR ART

In conventional half-tone dot imaging using methods of the kind described a colour component signal representing the colour component content of each pixel of the image on a grey scale is used to generate a binary beam control signal in conjunction with a half-tone dot map. The map stores colour component density values at each of a number of regions which together define the full region of the dot. A comparison is made between the incoming colour component signal and the corresponding dot region and depending on whether or not the image signal is greater than the value stored in the map, the beam is controlled to expose or not expose the record medium accordingly. An example of this is described in DE-A-3320691 (US-A-4897736).

Two problems arise with this method. Firstly, different colour components are used to generate colour separations at different screen angles to each other and commonly none of the dots at these screen angles exactly fit the dimensions of the half-tone dot map. In addition, the dot ruling (pitch) can be varied. This means that only a portion of the values in the map actually enters into the generation of any one dot. An adjacent dot will use a different subset. These differences are periodic and can produce moire because of the non-linearity produced by the thresholding or comparison operation.

The second problem manifests itself in particular if there is a simple integer relationship between the size of the dot and the dimension of the map. In this case only a restricted subset of map locations are ever visited and this can result in a restricted number of dot sizes being available so causing contouring. For example, a typical dot (at 90°) may be made up of exactly 12×12 sub-regions each of which is exposed or not exposed by the scanning beam in accordance with the binary control signal. However, the map may well have a different number of locations to define this region.

A document entitled "Real World PostScript" by Stephen F. Roth published by Addison-Wesley in 1988 describes a language for controlling laser printers and the like that are capable of producing graphics. It has a half-toning capability. The document admits, however, that the language has several drawbacks such as inaccurate angles and rulings or coarsely defined grey scales which produce contouring.

SUMMARY OF THE INVENTION

In accordance with one aspect of the present invention, a method of the kind described is characterised in that the half-tone dot map is of a size sufficient to enable the half-tone dot map to define a number of adjacent half-tone dot areas, each area corresponding to a half-tone dot and the content of at least some areas being different; in that the half-tone dot map is scanned in the same direction and with the same increments for all screen angles; in that each area of the map is scanned to generate a control signal for corresponding areas on the record medium; and in that prior to scanning the record medium at a particular screen angle, the half-tone dot map is determined which corresponds to that screen angle.

In accordance with a second aspect of the present invention, an apparatus for controlling the exposure of a record medium to a radiation beam during relative scanning movement between the medium and the beam to record half-tone separations at particular screen angles comprises a control signal generator; control means; and a store for storing a previously generated half-tone dot map under the control of the control means, the control signal generator being responsive to an image signal representing the colour content of an image and a signal from the store to generate a binary beam control signal by scanning the map in synchronism with the beam scanning the record medium and comparing the image signal with the current map value, the binary beam control signal being generated in accordance with the result of the comparison characterised in that the store is of a size sufficient to enable the half-tone dot map to define a number of adjacent half-tone dot areas, each area corresponding to a half-tone dot and the content of at least some areas being different; in that the control signal generator is responsive to each area in the map for generating the control signal for adjacent, corresponding areas on the record medium; in that the control means scans the half-tone dot map in the same direction and in the same increments for all screen angles and supplies corresponding map values to the control signal generator; and in that prior to scanning the record medium at a particular screen angle, the control means determines the corresponding half-tone dot map.

In this invention, instead of using a fixed size and orientation for the half-tone dot map and varying the X and Y increments in accordance with the screen angle, the increments are kept constant and the map itself is rotated and rescaled in accordance with the screen angle. Effectively, the X and Y increments are both made equal to one (or −1) for all screen angles and the problems mentioned above are avoided. It should be noted that this may result in a change in the size of the half-tone dot map. Furthermore, the map defines a number of half-tone dot areas.

In comparison with DE-A-3320691, the invention permits a wider range of screen angles, a greater control of screen ruling, and a much larger number of grey levels without contouring.

In many cases, the half-tone dot map will define a square region made up of square half-tone dot areas and the sides of the square will not generally be parallel (or orthogonal) to the scanning direction. This means that during a single scan line the position in the map which is scanned correspondingly will change significantly when a border of the map is reached. This is a problem because it is often difficult to detect when the border is reached. To improve on this, we have devised a method of constructing a modified half-tone dot map whose sides are parallel or orthogonal to the scanning direction, the modified map having an L-shaped form with the arms of the L-shape having lengths respectively of N+M and the greater of N and M where the screen angle r is defined by: N/M = tan r.

Other map shapes are also possible. A rectangular map would require 6 parameters: K, M and N as before and K', M' and N' to specify the other side of the rectangle. M'/N' should equal M/N. It is even possible to conceive of a map in the form of a parallelogram.

The invention is particularly suited for controlling scanning apparatus which includes a single beam but it could be adapted for use with multi-beam output scanners.

BRIEF DESCRIPTION OF THE DRAWINGS

An example of the inventive method and apparatus for generating half-tone dot colour separations will now be described with reference to the accompanying drawings, in which.

DETAILED DESCRIPTION OF THE PREFERRED EMBODIMENT

Figure 1:
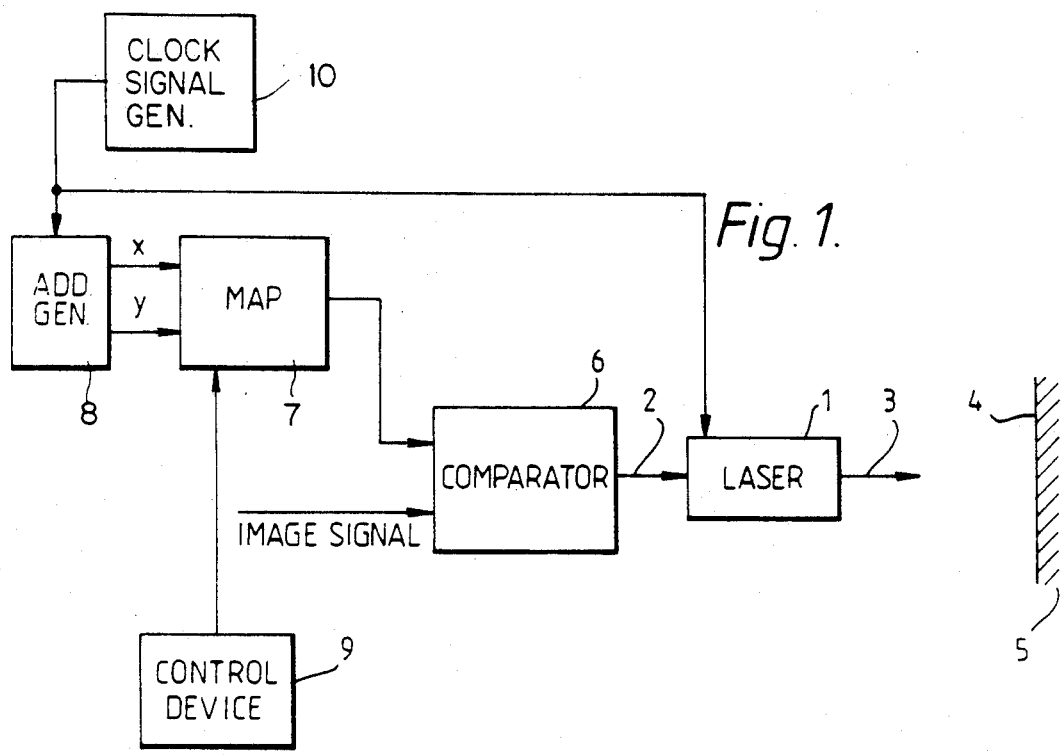
FIG. 1 is a block diagram of the apparatus.

The apparatus shown in FIG. 1 comprises a laser 1 which is responsive to a binary control signal 2 to modulate an output beam 3 to be on or off respectively depending upon the status of the control signal 2. In practice, this "modulation" may be achieved by means of modulating the laser itself or by feeding the control signal to a modulator to which the laser beam is also fed continuously. In the "on" condition the beam is arranged to impinge on a record medium 4 mounted on a support 5. In the case of a flat-bed scanner, the support 5 will cause the record medium 4 slowly to move in one direction while the beam 3 is caused rapidly to scan across the record medium 4 in the orthogonal direction.

The control signal 2 is generated from a comparator 6 to which is fed a grey level image signal defining the density of a colour component of each pixel of an image and a signal from a store 7 defining a half-tone dot value.

The map in the store 7 defines an array of half-tone dot areas, for example 36, each area itself defining a number of locations holding respective threshold values. Thus, each individual area of the map in the store 7 is equivalent to a conventional half-tone dot map but in contrast to conventional methods, the store 7 holds a number of such maps, each typically being slightly different in terms of the threshold values which are stored.

Prior to exposing the record medium, the store 7 is loaded with the map in the correct orientation and at the correct scale under the control of a suitable control device 9, such as a suitably programmed computer. In other words, the directions X, Y, parallel and orthogonal to the direction of scanning of the map, are always the same while the scanning increments ΔX, ΔY are both unity, irrespective of screen angle. To indicate when each unity increment should be added, a timing signal, or the like, e.g., a clock signal, may be generated by a common clock signal generator 10 and input to the address generator 8 and to the laser source 1, as shown in FIG. 1.

The signal from the store 7 is selected by means of an address generator 8 which generates X,Y signals corresponding to the current position of the laser beam 3 relative to the record medium 4. In this way, the map is effectively scanned in exactly the same manner as the record medium 4.

Figure 2:
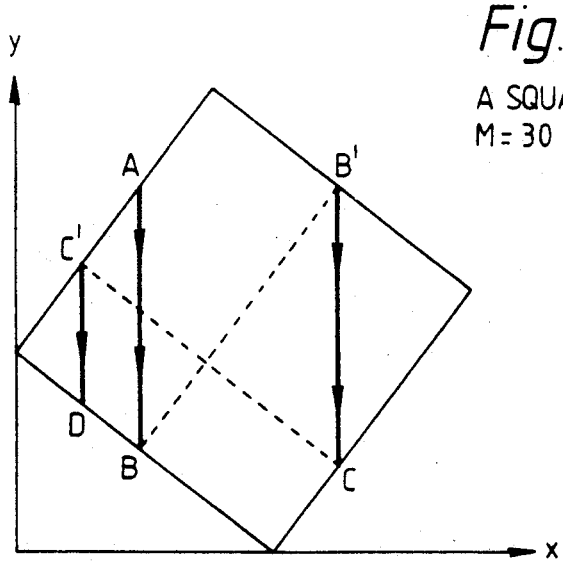
FIG. 2 illustrates an example of how the half-tone dot map would be scanned conventionally; and, FIGS. 3 and 4 illustrate modified forms of the half-tone dot map shown in FIG. 2.

FIG. 2 illustrates the orientation of a square map in store 7 defined by a number of individual half-tone dot areas, the map being positioned at an angle (the screen angle) to the direction of scanning. In a typical scanning process, the beam 3 will reach the position labelled A in FIG. 2 and will maintain the value X constant while decrementing the value Y by one unit at a time as the beam 3 scans along the line AB in FIG. 2. At the position B in the map, the comparator 6 needs to commence accessing threshold values from position B' since effectively the map shown in FIG. 2 is repeated or tessellated across the full scanning area. Thus, the values of X and Y are adjusted by the appropriate amounts and thereafter X is kept constant again while the value Y is decremented regularly as before while the beam scans from B' to C. Then another, different adjustment is required to enable the beam to scan from C' to D and so on. This process is complicated because the borders of the map are not parallel to either of the axes X,Y.

Figure 3:
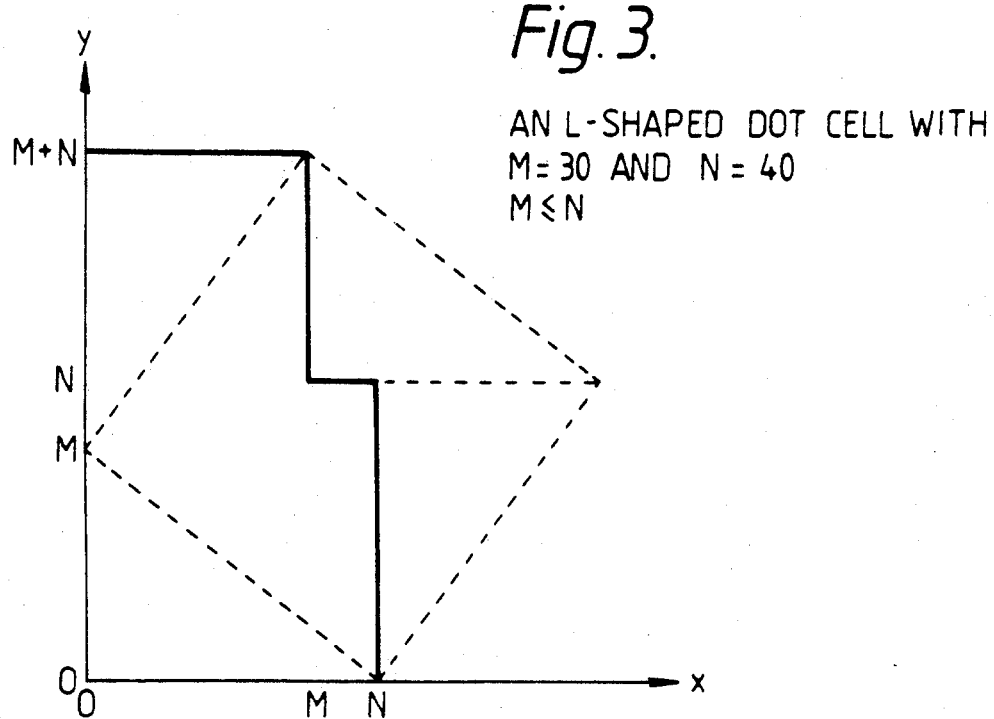

One way of simplifying this is to rearrange the map shown in FIG. 2 into the form shown in FIG. 3. The dimensions of this L-shaped block are M+N and the larger of M and N (in this case N), where M, N are as defined in FIG. 3. That is the screen angle r is defined by Tan r = N/M. M and N will be integers since the map must tesselate exactly.

FIG. 3 shows how it is possible to take the square map of FIG. 2 and, by relocating two triangular sections, construct an L-shape map of the same area that will also tessalate the plane. Advantages are that all borders are now parallel to the axes X,Y and, in particular, the two borders that are crossed by fast (Y) and slow (X) calculations are defined by Y=0 and X=0 respectively.

Figure 4:
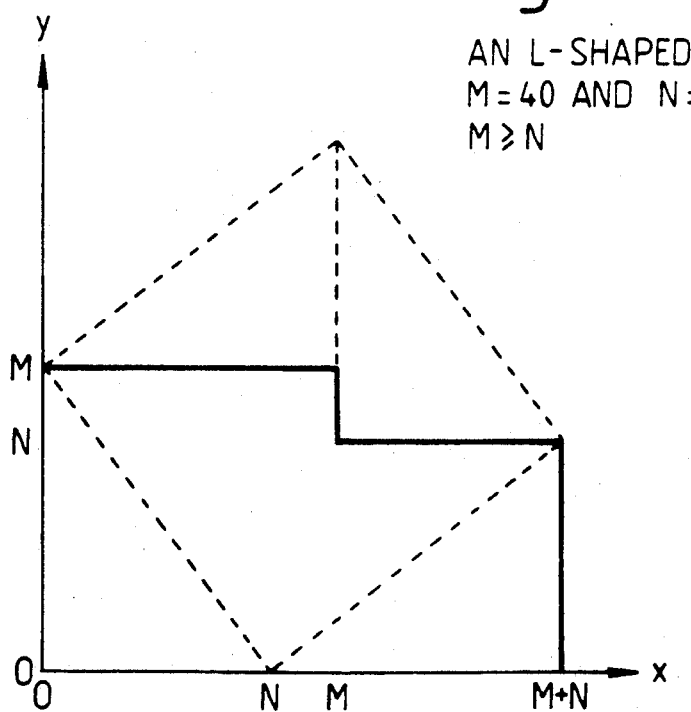

FIG. 3 applies if M is less than N. If M is greater than N then the construction is as shown in FIG. 4. It should be noted that the maximum dimension is always M+N and the other dimension is the greater of M and N.

As has been explained above, the map stored in the store 7 defines a number of full half-tone dot areas and, in the case of a square map, can be defined as having dimension K by K where K is the number of dots in either direction in the map. The map is thus defined by 3 parameters, K, M and N. It can be shown that to achieve ±$\frac{1}{2}$ degree precision in angle M or N need not exceed 64. Since one of the dimensions of the L-shaped map is M+N this means that the map need not exceed 128×128. This produces better than ±1% tolerance on the ruling. The value of K will usually be chosen empirically.

It should be noted that each change of shape, ruling or angle requires a new map. This makes it desirable to generate the map contents during initialization of the output scanner. Furthermore, if all separations (typically 3 or 4) are to be imaged together then the same number of separate maps are required because it may be necessary to switch from one to another in a matter of micro seconds. In one application this means that the store 7 must contain 128 Kbytes.

We claim:

1. A method of controlling an exposure of a record medium to a radiation beam during relative scanning movement between said medium and said beam, said method comprising the steps of:

generating a half-tone map at a particular screen angle;

providing an image signal representing a color content of an image;

generating a binary beam control signal by utilizing the image signal representing a color content of an image and a previously generated half-tone dot map at a particular screen angle, said binary beam control signal generating step including scanning said map in synchronism with said beam scanning said record medium and comparing the image signal with a current map value, said binary beam control signal being generated in accordance with a result of the comparison, wherein said half-tone dot map has a size sufficient to enable said half-tone dot map to define a number of adjacent complete half-tone dot areas, each area corresponding to a half-tone dot and a content of at least some areas being different, said half-tone dot map being scanned in a same direction and with same increments for all screen angles, each area of said map being scanned to generate a control signal for corresponding areas on the record medium and wherein prior to scanning said record medium at a particular screen angle, the content and orientation are determined for the half-tone dot map which corresponds to that screen angle.

2. A method according to claim 1, wherein the determination of the content and orientation of the half-tone dot map comprises constructing a modified half-tone dot map whose sides are either parallel or orthogonal to a scanning direction, the modified map having an L-shaped form with arms of the L having lengths respectively of N+M and a greater of N and M where a screen angle r is defined by: N/M=tan r.

3. Apparatus for controlling an exposure of a record medium to a radiation beam during relative scanning movement between the medium and the beam to record half-tone image separations at particular screen angles, the apparatus comprising:

a control signal generator;

control means; and a store for storing a previously generated half-tone dot map under control of said control means, said control signal generator being responsive to an image signal representing a colour content of an image and a signal from said store to generate a binary beam control signal by scanning said map in synchronism with the beam scanning the record medium and comparing the image signal with a current map value, said binary beam control signal being generated in accordance with a result of the comparison, wherein said store has a size sufficient to enable the half-tone dot map to define a number of adjacent half-tone dot areas, each area corresponding to a half-tone dot and a content of at least some areas being different, said control signal generator being responsive to each area in the map for generating the control signal for adjacent, corresponding areas on the record medium, said control means scanning the half-tone dot map in a same direction and in same increments for all screen angles and supplying corresponding map values to said control signal generator, and wherein prior to scanning the record medium at a particular screen angle, the control means determines the content and orientation of the half-tone dot map corresponding to the particular screen angle.

4. Apparatus according to claim 3, wherein said control means includes an address generator for scanning the store.

5. Apparatus according to claim 3, wherein said control signal generator comprises a comparator.

* * * * *